United States Patent [19]

Sakaguchi

[11] Patent Number: 4,758,915
[45] Date of Patent: Jul. 19, 1988

[54] RESILIENT SUPPORT FOR AN ECCENTRIC DRIVE PIN OF DISK DRIVE APPARATUS

[75] Inventor: Takahiro Sakaguchi, Kodaira, Japan

[73] Assignee: Teac Corporation, Tokyo, Japan

[21] Appl. No.: 35,376

[22] Filed: Apr. 6, 1987

[30] Foreign Application Priority Data

Apr. 11, 1986 [JP] Japan .................. 61-54416[U]

[51] Int. Cl.⁴ .................................... G11B 17/028
[52] U.S. Cl. .................................... 360/97; 360/99
[58] Field of Search .................................... 360/97, 99

[56] References Cited

U.S. PATENT DOCUMENTS

| 4,445,157 | 4/1984 | Takahashi | 360/133 |
| 4,649,444 | 3/1987 | Ichihara | 360/99 |
| 4,672,486 | 6/1987 | Bettini | 360/99 |

FOREIGN PATENT DOCUMENTS 60-163546 10/1985 Japan .
60-254457 12/1985 Japan .

*Primary Examiner*—Robert S. Tupper
*Attorney, Agent, or Firm*—Woodcock, Washburn, Kurtz, Mackiewicz & Norris

[57] ABSTRACT

A drive pin support mechanism for an apparatus for data transfer with a magnetic disk having a rigid hub of magnetic material attached centrally thereto, with the apparatus including an upstanding drive spindle for centering engagement in a central opening in the disk hub, a turntable rigidly mounted on the drive spindle and having a permanent magnet for attracting the disk hub and for holding the disk thereon, and a drive pin for driving engagement in an eccentric slot in the disk hub. The drive pin support mechanism includes a drive pin support spring fabricated from resilient sheet metal material and supported on the underside of the turntable for joint rotation therewith. The support spring is so configured as to permit the drive pin mounted thereon to slant in a direction opposite to the predetermined direction of rotation of the turntable. Also included is an abutment on the turntable for limiting the slanting of the drive pin during the operation of the apparatus in order to maintain the magnetic disk in constant angular relation to the turntable and to preclude instantaneous speed variations of the magnetic disk.

9 Claims, 6 Drawing Sheets

RESILIENT SUPPORT FOR AN ECCENTRIC DRIVE PIN OF DISK DRIVE APPARATUS

BACKGROUND OF THE INVENTION

My invention deals generally with apparatus for writing or reading information on disklike record media such as flexible magnetic disks, and more particularly with such data transfer apparatus of the class having a drive pin resiliently supported in an eccentric position on an turntable, the drive pin being engageable in an eccentric opening in the record medium for imparting rotation thereto. Still more particularly, my invention pertains to a resilient support mechanism for the drive pin of such data transfer apparatus.

A flexible magnetic disk having an eccentric slot to be engaged by a drive pin, and a disk drive for use therewith, are both described and claimed in U.S. Pat. No. 4,445,157 to Takahashi. The magnetic disk proposed by this patent has a diameter of 3.5 inches (86 millimeters) and is rotatably housed in a generally flat, boxlike envelope of relatively rigid plastic material to make up a disk cassette. The magnetic disk has a rigid hub of magnetic material attached centrally thereto. The hub has defined therein a central opening of square shape and an eccentric opening or slot of rectangular shape. When positioned in the associated disk drive, the magnetic disk has its central hub placed on a turntable of much smaller diameter than that of the disk. The turntable has a permanent magnet mounted thereon for attracting the disk hub. Extending from the central position on the turntable is a drive spindle engageable in the central opening in the disk hub for centering the disk. A drive pin is disposed eccentrically on the turntable for driving engagement in the eccentric slot in the drive hub, imparting the rotation of the turntable to the magnetic disk.

The drive pin must be elastically supported for displacement relative to the turntable in a direction parallel to the axis of the drive spindle, so as to spring into engagement in the eccentric slot in the disk hub following the commencement of the rotation of the turntable.

I know two different types of leaf springs that have been herefore suggested and used for resiliently supporting the drive pin on the turntable. One of these, disclosed in the Takahashi patent, is supported at three different points. The other type of drive pin support spring is cantilevered, being supported at one point only or substantially at one point, as taught by Japanese Laid Open patent application No. 60-254457. The latter type is finding a greater acceptance in the disk drive manufacturing industry by reasons of the simplicity of construction and ease of assemblage.

The cantilevered drive pin support spring according to the noted Japanese patent application may be described as generally U-shaped, bored at one extremity to fit over the drive spindle and carrying the drive pin on the other extremity. I object to this prior art spring because the drive pin tends to elastically slant in the direction of rotation of the magnetic disk, to such an extent as to give rise to an angular displacement of the disk with respect to the turntable. The drive pin is received in the eccentric slot in the disk hub with very substantial clearance. Consequently, as in the event of abrupt changes in the head-loading pressure on the magnetic disk as a result of vibrations or shocks exerted on the disk drive, the angle of the drive pin with respect to the plane of the magnetic disk may change, possibly resulting in instantaneous speed variations of the disk.

A solution to this problem is found in Japanese Laid Open Utility Model application No. 60-163546, which teaches the provision of a fixed abutment on the turntable for limiting the slanting of the drive pin in a direction opposite to the rotational direction of the magnetic disk. This solution is unsatisfactory, however, because the leaf spring supporting the drive pin permits its slanting away from the abutment, that is in the rotational direction of the magnetic disk.

SUMMAHY OF THE INVENTION

I have hereby invented how to support, in data transfer apparatus of the kind specified, the drive pin on the turntable for a minimum angular displacement between the turntable and the record medium thereon.

Broadly, my invention is directed to an apparatus for data transfer with a disklike record medium, with the apparatus including a drive spindle for centering engagement in a first opening defined centrally in the record medium, a turntable concentrically mounted to the drive spindle for joint rotation therewith in a predetermined direction and for supporting the record medium thereon, and a drive pin for driving engagement in a second opening defined eccentrically in the record medium, the drive pin being effective for imparting the rotation of the turntable to the record medium.

Characteristically, my invention concerns a drive pin support mechanism in the data transfer apparatus, comprising a drive pin support spring which is fabricated from resilient sheet metal material and which is generally disposed in a plane at right angles with the axis of the drive spindle for resiliently supporting the drive pin in an eccentric position with respect to the drive spindle and the turntable. The drive pin support spring integrally comprises: (a) a base portion rigidly mounted to the turntable substantially in concentric relation thereto; (b) a first arm portion extending substantially outwardly from the base portion with respect to the turntable; (c) a second arm portion extending from the radially outer end of the first arm portion in the predetermined direction of rotation of the turntable along an arc centered about the axis of the drive turntable; (d) a third arm portion extending substantially radially inwardly from a distal end of the second arm portion with respect to the turntable, and (e) a drive pin support portion formed on a distal end of the third arm portion and generally extending therefrom in a direction opposite to the predetermined direction of rotation of the drive spindle. The drive pin is fixedly mounted on the the drive pin support portion of the spring.

The drive pin support mechanism of my invention further includes an abutment formed on the turntable and disposed upstream of the drive pin with respect to the predetermined direction of rotation of the drive spindle, the abutment being abutted upon by the drive pin upon resilient slanding thereof during the rotation of the record medium for holding the record medium in a prescribed angular position relative to the turntable.

With the drive pin support spring configured and cantilevered as in the foregoing, the drive pin mounted on its support portion is capable of resiliently slanting in a direction opposite to the rotational direction of the turntable, besides being capable, of course, of resilient displacement parallel to the axis of the drive spindle. So slanted, the drive pin will come to rest on the abutment during the rotation of the magnetic disk, holding the latter in predetermined angular relation to the turntable.

The above and other features and advantages of my invention and the manner of realizing them will become more apparent, and the invention itself will best be understood, from a study of the following description and appended claims, with reference had to the attached drawings showing some preferable embodiments of the invention

DESCRIPTION OF THE PREFERRED EMBODIMENTS

Figure 1:
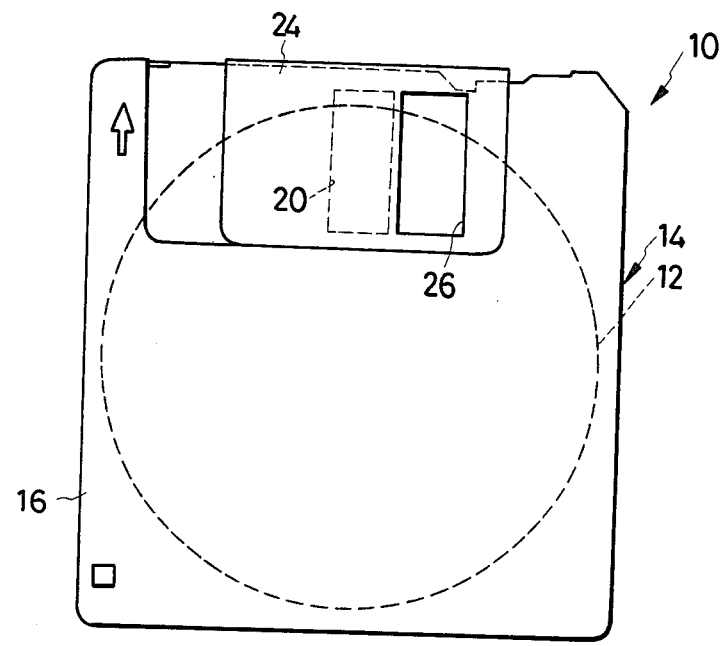
FIG. 1 is a top plan view of a known flexible magnetic disk cassette for use with the apparatus constructed in accordance with my invention.

I will first briefly describe the flexible magnetic disk cassette for use with the apparatus of my invention. Generally designated 10 in FIGS. 1 and 2, the disk cassette has a flexible magnetic disk 12 of 3.5-inch diameter rotatably housed in a protective envelope 14 of rigid plastic material. The envelope 14 is of approximately square, rather flat boxlike shape having a front or top side 16 seen in FIG. 1 and a rear or bottom side 18 seen in FIG. 2 Formed in both top 16 and bottom 18 sides of the envelope 14, in the vicinity of one edge thereof are apertures 20 and 22 in register with each other. These apertures 20 and 22 expose radial portions of the opposite sides of the magnetic disk 12 for data transfer contact with a pair of transducers or read/write heads to be set forth presently.

Normally, the apertures 20 and 22 are closed by a common sliding shutter 24 in the form of a rectangular piece of sheet metal material bent into the shape of a U to fit over one edge of the envelope 14. The shutter 24 has itself two apertures 26 and 28 which are out of register with the envelope apertures 20 and 22 when the shutter is in the illustrated normal or right hand position of FIGS. 1 and 2 under the bias of a spring (not shown). When the disk cassette 10 is loaded in the associated disk drive to be disclosed subsequently, the shutter 24 will be forced leftwardly against the force of the unshown spring. Thereupon the shutter apertures 26 and 28 will come into register with the envelope apertures 20 and 22 thereby exposing the radial portions of the opposite sides of the magnetic disk 12 for data transfer with the read/write heads of the disk drive.

Figure 2:
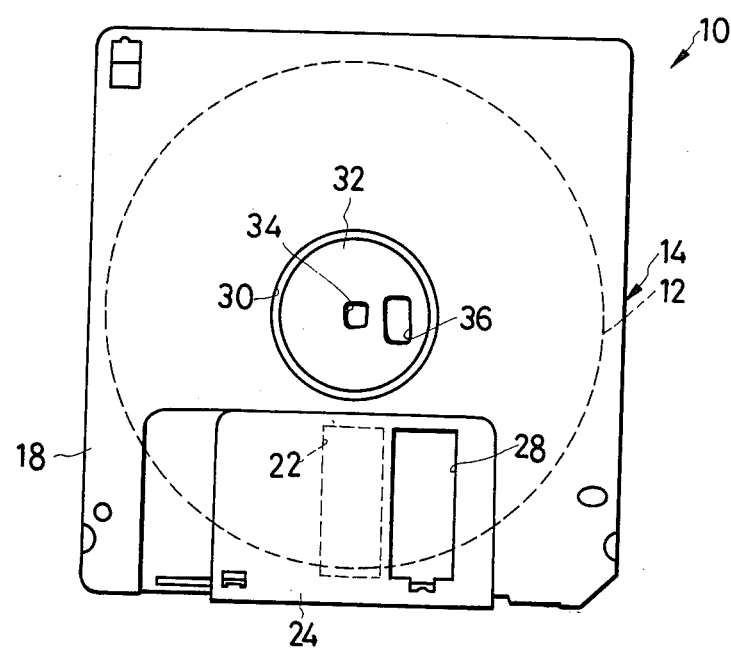
FIG. 2 is a bottom plan view of the magnetic disk cassette of FIG. 1.

The disk cassette 10 is to be placed upon the turntable of the disk drive with the top side 16 of its envelope 14 oriented upwardly. Thus, as shown in FIG. 2, the bottom side 18 of the envelope 14 has a circular opening 30 defined centrally therein to permit working engagement of the magnetic disk 12 with the turntable. Exposed through the opening 30 is a hub 32 in the form of a disk of magnetic sheet metal material attached centrally to the magnetic disk 12. The hub 32 has defined therein a central opening 34 of square shape and an eccentric opening or slot 36 of substantially rectangular shape.

Figure 3:
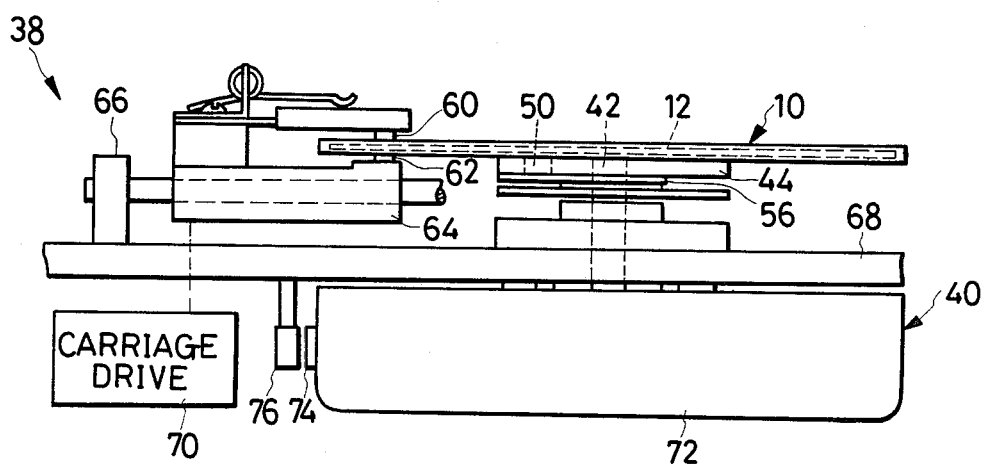
FIG. 3 is a side elevation of the disk drive for use with the disk cassette of FIGS. 1 and 2, the disk drive incorporating the improved drive pin support mechanism in accordance with my invention.
Figure 4:
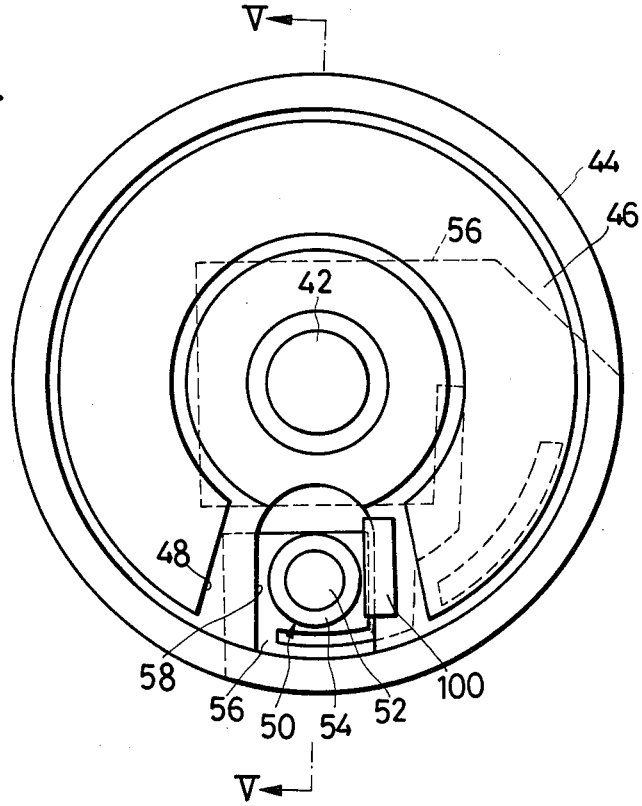
FIG. 4 is an enlarged top plan view of the turntable, shown together with the drive pin and other means mounted thereto, in the apparatus of FIG. 3.
Figure 5:
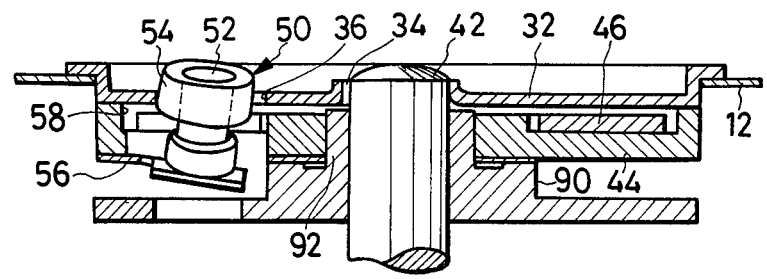
FIG. 5 is an axial section through the turntable of FIG. 1, taken along the line V—V therein and shown together with part of the flexible magnetic disk mounted in position therein, and with the drive pin shown in a state when the turntable and magnetic disk are in rotation.

Reference is now directed to FIGS. 3-5 for a study of the disk drive 38 for data transfer with the disk cassette 10 of FIGS. 1 and 2. The disk drive 38 has an electric disk drive motor 40, FIG. 3, which may be of the familiar rotor-outside-stator configuration. The disk drive motor 40 has a drive spindle 42 extending upwardly therefrom. Rigidly mounted on this drive spindle is a turntable 44 on which is to be placed the hub 32, FIG. 2, of the flexible magnetic disk 12. The turntable 44 has a permanent magnet 46 of what may be described as horseshoe shape, being annular and partly cut out at 48, FIG. 4, which is fixedly and concentrically mounted thereon for attracting the disk hub 32. The drive spindle 42 extends upwardly of the turntable 44 for centering engagement in the central opening 34 in the disk hub 32.

Arranged eccentrically on the turntable 44 is a drive pin 50 for driving engagement in the eccentric slot 36 in the disk hub 32. As shown in FIGS. 4 and 5, the drive pin 50 may be comprised of an upstanding shaft 52 and a roll 54 rotatably mounted thereon. The roll 54 may be made of so-called "oilless" metal or a rigid plastic with a minimum of frictional resistance, or it may be a ball bearing or equivalent device. Mounted on a support spring 56 underlying the turntable 44 for joint rotation therewith, the drive pin 50 extends upwardly therefrom through an aperture 58 in the turntable and the cutout 48 in the permanent magnet 46. I will later describe in detail the drive pin support spring 56 which forms the gist of my invention.

When the disk cassette 10 is placed on the turntable 44 as shown in FIGS. 3 and 5, the drive spindle 42 will immediately enter the central opening 34 in the disk hub 32. In all likelihood, however, the drive pin 50 will be initially out of register with the eccentric slot 36 in the disk hub 32 and so will be thereby depressed into the turntable 44 against the force of the support spring 56.

After the turntable 44 is subsequently set into rotation, the drive pin 50 will come into register with the eccentric slot 36 and will make driving engagement therein under the force of the support spring 56, imparting the rotation of the turntable to the magnetic disk 12 within the cassette envelope 14.

With reference to FIG. 3 the disk drive 38 is further conventionally equipped with a pair of read/write heads 60 and 62 for data transfer with the opposite sides of the magnetic disk 12. These heads are mounted on a carriage 64 slidable along a pair of guide rods 66, one seen, which are stationarily mounted on a platform 68 and which extend radially of the magnetic disk 12 on the turntable 44. The disk drive motor 40 is mounted on the underside of the platform 68, and the drive spindle 42 rotatably extends upwardly therethrough. I have shown a carriage drive mechanism as a block 70 because of its well known nature. In practice the carriage drive mechanism 70 may comprise a bidirectional motor of the electric stepping type and a motion translating mechanism such as a lead screw for converting the bidirectional, incremental rotation of the stepping motor into the linear, stepwise reciprocating motion of the carriage 64.

FIG. 3 also indicates that the rotor 72 of the disk drive motor 40 is provided with an index in the form of a permanent magnet 74 in a preassigned angular position thereon. An index sensor 76 in the form of a magneto-electric detector is supported in a fixed location opposite the path of the permanent magnet 74, for producing an electric output pulse each time the magnet travels past the sensor. The magnet 74 can be disposed in predetermined angular positional relation to the drive pin 50 and hence to the magnetic disk 12 on the turntable 44. Accordingly, the angular position of the magnetic disk 12 on the turntable 44 is ascertainable from the output from the index sensor 76.

Figure 7:
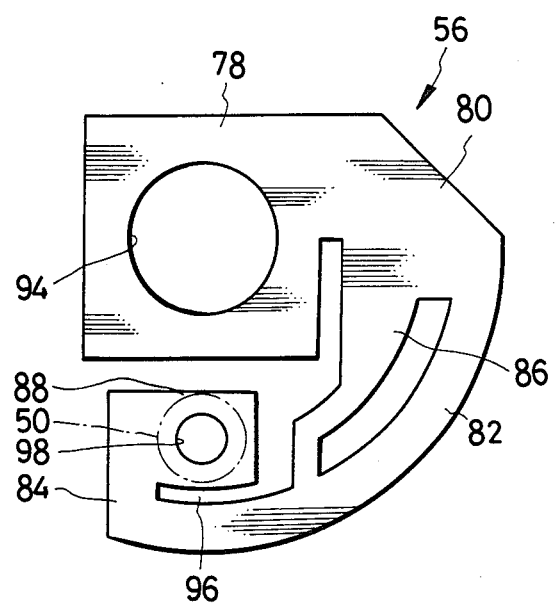
FIG. 7 is a top plan view of the drive pin support spring forming a part of the drive pin support mechanism of my invention and used in the apparatus of FIG. 3.

I will now refer to FIG. 7 for a detailed discussion of the drive pin support spring 56. Such discussion will be better understood by referring also to FIG. 4, in which the drive pin support spring 56 is depicted in phantom outline to indicate the positions of the various parts of the spring with respect to the 10 drive spindle 42, turntable 44 and drive pin 50.

Fabricated from resilient sheet metal material, the drive pin support spring 56 of this particular embodiment integrally comprises a base portion 78, a first arm portion 80, a second arm portion 82, third arm portion 84, a fourth arm portion 86, and a drive pin support portion 88.

The base portion 78 of the drive pin support spring 56 is captured fast between the turntable 44 and the underlying flange 90, FIG. 5, of a sleeve 92 on the drive spindle 42. A hole 94 is defined centrally in the base portion 78 to permit the drive spindle 42, as well as the sleeve 92, to extend therethrough. The first arm portion 80 extends from the base portion 78 in a substantially radially outward direction of the turntable 44. The second arm portion 82 extends from the radially outer end of the first arm portion 80 along the circumference of the turntable 44 through an angle of about 90 degrees. I understand that the turntable 44 rotates clockwise as viewed in FIG. 4. It will therefore be seen that the second arm portion 82 extends arcuately from the first arm portion 80 in the predetermined rotational direction of the turntable 44. The third arm portion 84 extends to a comparatively short extend substantially, and not precisely, radially inwardly of the turntable 44 from the downstream end, with respect to the rotational direction of the turntable, of the second arm portion 82.

Formed on the radially inner end of the third arm portion 84, the drive pin support portion 88 is of approximately square shape and may be thought of as generally extending from the third arm portion in a direction opposite to the predetermined rotational direction of the turntable 44. An arcuate slit 96 separates the drive pin support portion 88 from the second arm portion 82. A hole 98 is formed in the drive pin support portion 88 for use in rigidly and upstandingly mounting the shaft 52 of the drive pin 50. An inspection of FIG. 7 will further indicate that the drive pin support portion 88 extends across, and at right angles with, a vertical plane containing the parallel axes of the drive pindle 42 and drive pin 50. The third arm portion 84 extends parallel to, and lies on the downstream side of, the noted vertical plane with respect to the rotational direction of the turntable 44.

The fourth arm portion 86 of the drive pin support spring 56 is disposed radially inwardly of the second arm portion 82 with respect to the turntable 44 and interconnects the first and second arm portions 80 and 82 by way of reinforcement. The provision of this fourth arm portion is not essential, provided that the first and second arm portions are strong enough to support the drive pin 50 in the intended manner.

Figure 6:
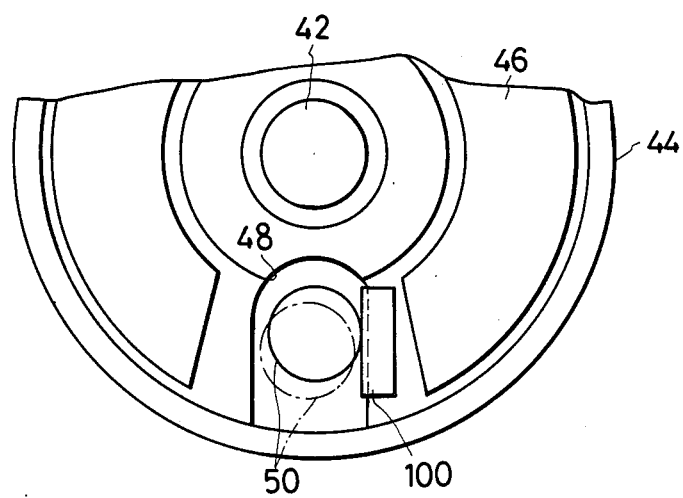
FIG. 6 is a fragmentary top plan view of the turntable, shown together with the drive pin slanting into contact with the fixed abutment on the turntable during the rotation of the turntable.

Mounted as above on the support portion 88 of the support spring 56, the drive pin 50 extends upwardly through the aperture 48, FIGS. 4 and 6, in the turntable 44 with substantial clearance. The clearance is such that the drive pin 50 is displaceable, within the limits determined by the support spring 56, without contacting the edges bounding the aperture 48. The drive pin 50 protrudes upwardly of the turntable 44 to an extent necessary for driving engagement in the eccentric slot 36 in the disk hub 32.

As shown in both FIGS. 4 and 6, my invention also features an abutment 100 formed on the turntable 44 and disposed upstream of the drive pin 50 with respect to the predetermined rotational direction of the turntable. This abutment 100 is to be abutted upon by the drive pin 50 during the rotation of the turntable 44 with the magnetic disk 12 thereon. The angular position of the abutment 100 on the turntable 44 is predetermined in relation not only to that of the drive pin 50 but also to the index 74, FIG. 3, on the rotor 72 of the disk drive motor 40.

Normally, or when the turntable 44 is out of rotation, the drive pin 50 extends vertically and out of contact with the abutment 100, as illustrated in FIG. 4. As will be seen from both FIGS. 6 and 8, the drive pin 50 will slant with the deflection of the support spring 56 and so come into contact with the abutment 100 shortly after the turntable 44 has been set into rotation with the magnetic disk 12 thereon. The drive pin 50 is in what I call the "final drive position" with respect to the eccentric slot 36 in the disk hub 32 when the drive pin is in contact with the abutment 100. I will explain hereafter this final drive position of the drive pin 50 with reference to FIG. 9.

When the magnetic disk cassette 10 is loaded in the disk drive 38, and the disk 12 placed concentrically on the turntable 44, the drive spindle 42 will enter the central opening 34 in the disk hub 32. Being perhaps out of register with the eccentric slot 36 in the disk hub 32, the drive pin 50 will be depressed into the turntable 44 by the disk hub 32 against the force of the support spring 56 as the permanent magnet 46 on the turntable attracts the disk hub. It is mostly the second and third arm portions 82 and 84 of the support spring 56 that will deflect to allow such retraction of the drive pin 50 into the turntable 44.

As the turntable 44 is subsequently set into rotation by the disk drive motor 40 in a clockwise direction as viewed in FIG. 9, the drive pin 50 will slide under the disk hub 32 and, before one complete revolution of the turntable, will come into register with the eccentric slot 36 in the disk hub 32. Thereupon the drive pin 50 will throw itself into the slot 36 by virtue of the energy that has been stored in the support spring 56 upon deflection of its arm portions 82 and 84. When thus admitted into the eccentric slot 36, the drive pin 50 will initially occupy the position indicated by the phantom outline in FIG. 9, which position is at or adjacent the upstream end of the slot with respect to the rotational direction of the turntable 44.

Figure 9:
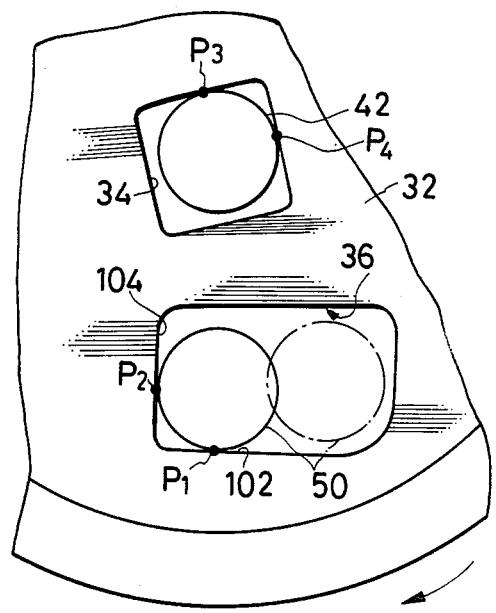
FIG. 9 is an enlarged, fragmentary top plan view explanatory of the drive position of the drive pin in the eccentric slot in the hub of the magnetic disk, and of the position of the drive spindle in the central opening of the disk hub during the rotation of the magnetic disk.

A consideration of FIG. 9 will reveal that the eccentric slot 36 extends at an angle to, rather than at right angles with, a line connecting the axis of the disk hub 32 and the geometrical center of the slot. That angle is such that the radially outer edge 102 bounding the slot 36 draws nearer the center of the disk hub 32 as it extends leftwardly as viewed in FIG. 9. Consequently, the distance between the center of the disk hub 32 and the point of contact between drive pin 50 and edge 102 comes to a minimum when the drive pin reaches the solid line position of FIG. 9, contacting the edge 30 at point P1 and the downstream edge 104 of the slot 36 at point P2. This is the final drive position. The drive pin 50 is in proper driving engagement with the slot 36 when in this final drive position. The drive pindle 42, on the other hand, will contact at points P3 and P4 the generally square disk hub edges defining the central hole 34 when the drive pin 50 is in the final drive position.

Before reaching the final drive position, the drive pin 50 will come into contact with the edge 102 of the slot 36 at a point somewhere to the right of the point P1 as the drive pin revolves clockwise with the turntable 44 after entering the slot 36 in the phantom position of FIG. 9. With the continued rotation of the turntable 44 relative to the disk hub 32 the drive pin 50 will slide over the edge 102 of the slot 36 and will be thereby gradually forced toward the center of the disk hub 32 against the effect of the support spring 56. Thus, in the final drive position, the drive pin 50 will slant radially inwardly of the disk hub 32 to the maximum possible degree.

Figure 8:
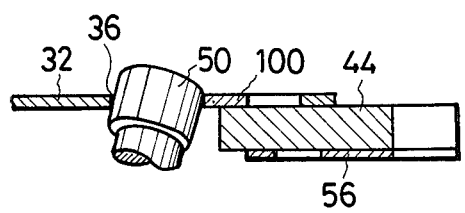
FIG. 8 is a fragmentary vertical section, partly in elevation, explanatory of the positional relationship among the drive pin, abutment and disk hub during the rotation of the magnetic disk.

Also, in the final drive position, the drive pin 50 will butt on the downstream edge 104 of the slot 36 at the point P2 to impart the rotation of the turntable 44 to the magnetic disk 12. By reaction, then, the drive pin 50 will slant upstream of the turntable 44, with the consequent deflection of the support spring 56, until the drive pin comes into contact with the abutment 100 on the turntable 44. FIG. 8 indicates that the drive pin 50 is positively engaged between disk hub 32 and abutment 100 in the final drive position. Under all the usual operating conditions of the disk drive 38 the drive pin 50 will remain in this final drive position as long as the turntable 44 is in rotation with the magnetic disk 12 thereon.

I have mentioned that the angular position of the abutment 100 on the turntable 44 is predetermined in relation to that of the index 74 on the rotor 72 of the disk drive motor 40. Since the drive pin 50 will remain in positive engagement with the abutment 100 during the progress of data transfer, the magnetic disk 12 will also remain in constant angular relation to the index 74, making it possible to ascertain the exact angular position of the magnetic disk from the index. It is also to be appreciated that, although resiliently supported, the drive pin 50 is positively captured between disk hub 32 and abutment 100 as in FIG. 8 during disk rotation. The magnetic disk 12 will therefore suffer far less instantaneous speed variations than heretofore in the face of possible shocks or vibrations that may be exerted on the disk drive 38 during its operation.

As will be understood by referring again to FIG. 7, I asribe the desired tilting of the drive pin 50 in the upstream direction of the turntable 44 to the third arm portion 84 of the support spring 56 substantially pivotally supporting the drive pin support portion 88 on its upstream side. No such desired result would be obtained if the drive pin support portion 88 were joined directly to the second arm portion 82, that is, if it were not for the slit 96 between second arm portion 82 and support portion 88, as has been the case heretofore.

Second Form

Figure 10:
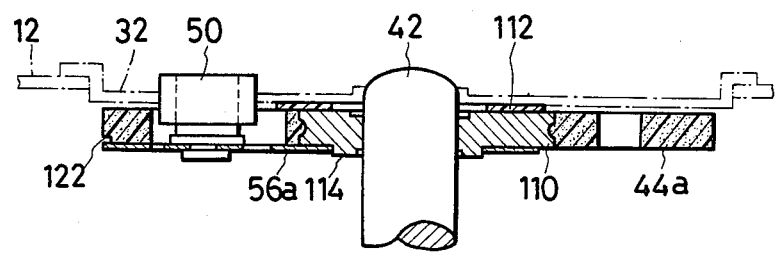
FIG. 10 is a view similar to FIG. 3 but showing an alternate embodiment of my invention.
Figure 11:
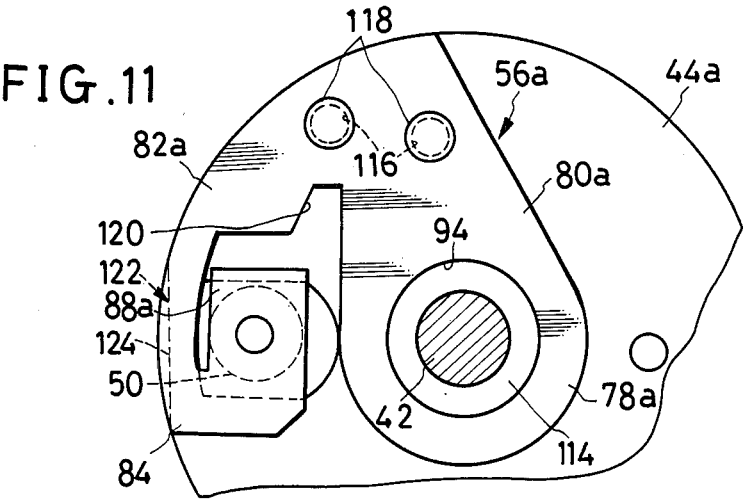
FIG. 11 is an enlarged, fragmentary bottom plan view of the turntable and drive pin support spring in the alternate embodiment of FIG. 10.
Figure 12:
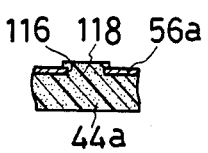
FIG. 12 is a fragmentary vertical section explanatory of the way in which the drive pin support spring is secured to the turntable in the alternate embodiment of FIGS. 10 and 11.

In another preferred embodiment of my invention shown in FIGS. 10–12 a drive pin support spring 56a of slightly modified shape is mounted on the underside of a turntable 44a. As will be noted upon comparison of FIG. 10 with FIG. 5, this turntable 44a also differs in construction from the turntable 44 of the preceding embodiment but can be incorporated in the disk drive 38 of FIG. 3 in substitution for the turntable 44. The alternate turntable 44a is itself fabricated from a known magnetic plastic material, having a relatively large central bore in which is rigidly mounted a metal-made bushing 110. In practice the turntable 44a may be molded in place on the bushing 110. A flat ring 112 of, for example, a plastic containing fluorine, is rigidly mounted on the bushing 110 by way of a spacer between the magnetic turntable 44a and the hub 32 of the magnetic disk 12.

I have illustrated in FIG. 11 the configuration of the alternate drive pin support spring 56a as seen from the underside of the turntable 44a. Also made of resilient sheet metal material, the support spring 56a integrally comprises a base portion 78a, first arm portion 80a, second arm portion 82a, third arm portion 84a, and drive pin support portion 88a.

The base portion 78a has the central hole 94 to fit over the boss 114 of the turntable bushing 110. Two additional holes 116 are formed at or adjacent the joined ends of the first and second arm portions 80a and 82a to receive projections 118 on the underside of the magnetic plastic turntable 44a. As shown in detail in FIG. 12, each projection 118 is clinched after being engaged in one of the holes 116, in order to provide an enlarged head effective to prevent the detachment of the arm portions 80a and 82a from the turntable 44a. 1 could, of course, employ screws or lhe like in place of the headed projections 118 for fastening the drive pin support spring 56a to the turntable 44a. Also, as will be readily understood, I could secure only either of the first and second arm portions 80a and 82a at one point only. As either or both of the arm portions 80a and 82a are thus secured to the turntable 44a, the base portion 78a of the drive pin support spring 56a need not be secured to the turntable against angular displacement; thus, the hole 94 in the base portion 78a may loosely receive the boss 114 of the turntable bushing 110.

The second arm portion 82a of the drive pin support spring 56a is reinforced by its wider portion 120 through which the second arm portion is joined to the first arm portion 80a. This wider portion 120 corresponds to the fourth arm portion 86, FIG. 7 of the first disclosed drive pin support spring 56. Essentially, therefore, the alternate support spring 56a is equivalent in construction and operation to the support spring 56 of FIG. 7.

As shown in both FIGS. 10 and 11, this second embodiment also features a recess 122 cut peripherally in the underside of the turntable 44a. The recess 122 is intended to provide a linear step 124, FIG. 11, extending generally along the second arm portion 82a of the drive pin support spring 56a and at right angles with a plane containing the parallel axes of the drive spindle 42 and drive pin 50. Experiment has proved that this linear step 124 contributes to ensure the tilting of the drive pin 50 toward both drive spindle 42 and abutment 100, FIGS. 4, 6 and 8 by fulcruming the support spring 56a.

It is to be understood that I have disclosed the foregoing preferable embodiments by way of example only and not to impose limitations upon my invention. A variety of modifications or alterations of such specific embodiments will readily occur to one skilled in the art within the broad teaching hereof. For example:

1. The position of the abutment 100 may be made adjustable toward and away from the drive pin.
2. The abutment may be integral part of the turntable.
3. The second arm portion 82 or 82a of the drive pin support spring 56 or 56a may extend through an angle anywhere in the range of 45-130 degrees, instead of just 90 degrees as in the first disclosed embodiment.
4. The drive pin 50 may contact the abutment 100 when the apparatus is out of operation, but only to such an extent as to be resiliently displaceable up and down as intended.

What I claim is:

1. In an apparatus for data transfer with a disklike record medium, with the apparatus including a drive spindle for centering engagement in a first opening defined centrally in the record medium, a turntable concentrically mounted to the drive spindle for joint rotation therewith in a predetermined direction and for supporting the record medium thereon and a drive pin for driving engagement in a second opening defined eccentrically in the record medium, the drive pin being effective for imparting the rotation of the turntable to the record medium, a drive pin support mechanism comprising:

(a) a drive pin support spring fabricated from resilient sheet metal material, the drive pin support spring being workably mounted to the turntable for joint rotation therewith and generally disposed in a plane at right angles with the axis of the drive spindle for resiliently supporting the drive pin in an eccentric position with respect to the turntable, the drive pin support spring integrally comprising:
   (1) a base portion mounted to the turn table substantially in concentric relation thereto;
   (2) a first arm portion having a first and a second end and extending substantially radially with respect to the turntable, the first end of the first arm portion being joined to the base portion;
   (3) a second arm portion having a third and a fourth end and extending along an arc centered about the axis of the drive spindle, the second arm portion having the third end joined to the second end of the first arm portion and extending in the predetermined direction of rotation of the drive spindle as it extends from the third to fourth end thereof;
   (4) a third arm portion having a fifth and a sixth end and extending substantially radially inwardly from the fourth end of the second arm portion with respect to the turntable, the fifth end of the third arm portion being joined to the fourth end of the second arm portion; and
   (5) a drive pin support portion formed on the sixth end of the third arm portion and generally extending therefrom in a direction opposite to the predetermined direction of rotation of the drive spindle, the drive pin support portion having the drive pin fixedly and upstandingly mounted thereon;
   (6) whereby the drive pin is capable of resiliently slanting in an upstream direction with respect to the predetermined direction of rotation of the drive spindle during the rotation of the record medium, besides being capable of resilient displacement substantially in a direction parallel to the axis of the drive spindle; and
   (b) an abutment formed on the turntable and disposed upstream of the drive pin with respect to the predetermined direction of rotation of the drive spindle, the abutment being abutted upon by the drive pin upon resilient slanding thereof during the rotation of the record medium for holding the record medium in a prescribed angular position relative to the turntable.

2. The data transfer apparatus of claim 1 wherein the base portion of the drive pin support spring has a hole defined centrally therein for the passage of the drive spindle therethrough.

3. The data transfer apparatus of claim 1 wherein the second arm portion of the drive pin support spring extends arcuately through an angle in the range of 45-130 degrees.

4. The data transfer apparatus of claim 1 wherein the drive pin has an axis parallel to the axis of the drive spindle and wherein the third arm portion of the drive pin support spring extends parallel to a line right-angularly intersecting the axes of the drive spindle and the drive pin.

5. The data transfer apparatus of claim 1 wherein the drive pin support spring further integrally comprises a fourth arm portion joining the first and second arm portions and generally disposed radially inwardly of the second arm portion with respect to the turntable.

6. The data transfer apparatus of claim 1 wherein at least either of the first and second arm portions of the drive pin support spring is secured to the turntable.

7. The data transfer apparatus of claim 1 wherein the drive pin has an axis parallel to the axis of the drive spindle, and wherein a recess is formed peripherally in the underside of the turntable so as to provide a linear step extending generally along the second arm portion of the drive pin support spring and at right angles with a plane containing the parallel axes of the drive spindle and the drive pin.

8. In an apparatus for data transfer with a magnetic disk having a rigid hub of magnetic material attached centrally thereto, with the apparatus including a drive motor having a drive spindle extending upwardly therefrom for centering engagement in a central opening in the hub of the magnetic disk, a turntable concentrically mounted to the drive spindle for joint rotation therewith in a predetermined direction and being capable of magnetically attracting the hub of the magnetic disk for supporting the magnetic disk thereon, and a drive pin for driving engagement in an eccentric slot in the hub of the magnetic disk, the drive pin having a preassigned final drive position with respect to the eccentric slot for imparting the rotation of the turntable to the record medium, a drive pin support mechanism comprising:

(a) a drive pin support spring fabricated from resilient sheet metal material and disposed on the underside of the turntable for joint rotation therewith, the drive pin support spring integrally comprising:

(1) a base portion having a hole defined substantially centrally therein for permitting the drive spindle to pass therethrough;

(2) a first arm portion having a first and a second end and extending substantially radially with respect to the turntable, the first end of the first arm portion being joined to the base portion;

(3) a second arm portion having a third and a fourth end and extending along an arc centered about the axis of the drive spindle, the second arm portion having the third end joined to the second end of the first arm portion and extending in the predetermined direction of rotation of the drive spindle as it extends from the third to fourth end thereof;

(4) a third arm portion having a fifth and a sixth end and extending substantially radially inwardly from the fourth end of the second arm portion with respect to the turntable, the fifth end of the third arm portion being joined to the fourth end of the second arm portion; and (5) a drive pin support portion formed on the sixth end of the third arm portion and generally extending therefrom in a direction opposite to the predetermined direction of rotation of the drive spindle, the drive pin support portion having the drive pin fixedly and upstandingly mounted thereon, the drive pin extending with clearance through an aperture in the turntable for driving engaggement in the eccentric slot in the hub of the magnetic disk;

(6) whereby the drive pin support spring permits the drive pin to be tilted by the magnetic disk in an upstream direction with respect to the predetermined direction of rotation of the drive spindle during the rotation of the magnetic disk, besides permitting the drive pin to be displaced substantially in a direction parallel to the axis of the drive spindle; and (b) an abutment formed on the turntable and disposed upstream of the drive pin with respect to the predetermined direction of rotation of the drive spindle, the abutment being abutted upon by the drive pin upon resilient slanting thereof during the rotation of the magnetic disk for holding the drive pin in the final drive position in the eccentric slot in the hub of the magnetic disk, the drive pin being positively engaged between the hub of the magnetic disk and the abutment in the final drive position.

9. The data transfer apparatus of claim 8 wherein the turntable is fabricated from magnetic plastic material and is formed to include a projection disposed eccentrically on its underside, and wherein at least either of the first and second arm portions of the drive pin support spring has a hole for receiving the projection of the turntable, the projection being headed in order to prevent disengagement of the drive pin support spring therefrom.

* * * * *

UNITED STATES PATENT AND TRADEMARK OFFICE
CERTIFICATE OF CORRECTION

PATENT NO. : 4,758,915

DATED : Jul. 19, 1988

INVENTOR(S) : Takahiro Sakaguchi

It is certified that error appears in the above-identified patent and that said Letters Patent is hereby corrected as shown below:

Col. 2, line 13, change "SUMMAHY" to -- SUMMARY --.

Col. 8, line 60, "1th" should be -- the --.

Signed and Sealed this

Twenty-first Day of March, 1989

Attest:

DONALD J. QUIGG

Attesting Officer

Commissioner of Patents and Trademarks